United States Patent Office 2,900,331
Patented Aug. 18, 1959

2,900,331

HYDROCATALYTIC DESULFURIZATION OF A MIXTURE OF STRAIGHT-RUN AND CATALYTICALLY CRACKED GAS OILS

Frederick William Bertram Porter and Ernest Carlton Housam, Sunbury-on-Thames, England, assignors to The British Petroleum Company Limited No Drawing. Application November 30, 1954
Serial No. 472,242

Claims priority, application Great Britain December 10, 1953

4 Claims. (Cl. 208—214)

This invention relates to the hydrocatalytic desulfurization of petroleum hydrocarbons and more particularly to the hydrocatalytic desulfurization of blended feedstocks containing catalytically-cracked components boiling in the gas oil range.

The autofining process as applied to various petroleum feedstocks is described in United States Patents Nos. 2,573,726 and 2,574,445–51. The autofining process was originally operated at a fixed pressure and any hydrogen generated in excess of that required to maintain this fixed pressure was vented from the system. It was found, however, that increased desulfurization was obtained by recycling all the hydrogen produced during the reaction and allowing the pressure to build up to an equilibrium pressure, and this method of operation forms the subject of United States Patent No. 2,648,623. A particularly effective catalyst for use in carrying out the autofining process consists of the oxides of cobalt and molybdenum incorporated with or deposited on alumina. Improved results are obtained if the catalyst contains fluorine which is advantageously present in an amount between 1 and 4 percent by weight of the catalyst, since it has been found that the presence of the fluorine increases the dehydrogenating activity of the catalyst and thereby enables higher equilibrium pressures to be built up resulting in increased desulfurization.

Methods of preparing cobalt oxide—molybdenum oxide catalysts containing fluorine are described in United States application No. 311,429, filed September 25, 1952, now U.S. Patent No. 2,800,429, granted July 23, 1957. As disclosed therein, the fluorine is present in an amount of about 0.1% to about 6% by weight of the catalyst.

According to the present invention, a process for the hydrocatalytic desulfurization of a petroleum feedstock containing a catalytically cracked component boiling in the gas oil range, comprises contacting the feedstock with a catalyst consisting of or comprising the oxides of cobalt and molybdenum incorporated with or deposited on alumina, said catalyst also containing fluorine, under autofining conditions of temperature and space velocity, and recycling the hydrogen-rich gas separated from the treated feedstock until the pressure in the reaction zone reaches equilibrium.

After the pressure in the reaction zone has reached equilibrium, the process may thereafter be operated as an autofining process, in which case the equilibrium pressure, and therewith the extent of desulfurization, gradually falls as the dehydrogenating activity of the catalyst decreases.

Increased hours on stream may be obtained by maintaining the autofining equilibrium pressure by means of hydrogen added from an extraneous source. By operating in this manner, the decline in the dehydrogenating activity of the catalyst is retarded and the hours on stream before regeneration are considerably lengthened.

Although under these conditions, the process is now a nett consumer of hydrogen, the overall hydrogen consumption for a given sulfur removal is only a fraction of that obtained when carrying out a hydrofining operation at the conventional higher pressures.

The temperature and the space velocity required for any particular feedstock can easily be determined by experiment, but in general the following range of conditions apply:

Temperature _____ 750–800° F.
Space velocity _____ 1–5 v./v./hr.

The process according to the invention is illustrated by the following examples.

Example I

A 20 percent by volume blend of catalytic cracker gas oil in straight run gas oil was autofined during a run of 125 hours duration. Operating conditions together with inspection data on feed and products are given below:

Conditions:
Temperature, ° F _____ 800
Pressure _____ equilibrium
Space Velocity v./v./hr _____ 1.0
Gas Recycle Rate s.c.f.b _____ 2000 set 100 p.s.i.ga.
Catalyst _____ Fluorine-activated cobalt molybdate on alumina

| Inspection Data | S.G. @ 60° F./ 60° F. | Total Sulfur, Percent wt. |
|---|---|---|
| Cat. cracked gas oil (254°–308° C.) | 0.8995 | 2.54 |
| Straight Run Gas Oil | 0.8435 | 1.26 |
| Blend | 0.856 | 1.52 |
| Product sample drawn after [1]— | | |
| 10 hours on stream | 0.835 | 0.01 |
| 20 hours on stream | 0.834 | 0.01 |
| 30 hours on stream | 0.835 | 0.01 |
| 40 hours on stream | 0.836 | 0.03 |
| 50 hours on stream | 0.837 | |
| 75 hours on stream | 0.8375 | 0.09 |
| 100 hours on stream | 0.841 | 0.18 |
| 125 hours on stream | 0.8445 | 0.49 |

[1] Not stabilised.

Bulked Product (20–125 hours on stream) 96% by vol. distillate:
Specific Gravity, 60° F./60° F _____ 0.850
Boiling Range, A.S.T.M., ° C _____ 180–350
Flash Point, ° C _____ 166
Pour Point, ° F _____ —5
Bromine No. _____ 6.0
Conradson Carbon Residue, Percent wt _____ 0.05
Diesel Index _____ 50
Cetane No. (Calc.) _____ 53
Aniline Point, ° C _____ 61.4
Sulfur, Percent wt _____ 0.1

Example II

Details of the feedstock blend were:

| Component | Percent wt. in blend | A.S.T.M. Boiling range, ° C. | Sulfur, Percent wt. |
|---|---|---|---|
| Catalytic Cracker Products: | | | |
| Re-run bottoms | 10.1 | 218–266 | 2.38 |
| Light cycle oil | 20.1 | 254–308 | 2.54 |
| Kerosine | 28.1 | 226–266 | 0.58 |
| Straight run naphtha | 41.7 | 85–140 | 0.02 |
| Total blend | | 85–285 | 0.93 |

The conditions used were:

Catalyst _____ Flourine - activated cobalt molybdate on alumina.
Space velocity _____ 1.0 v./v./hr.
Temperature _____ 800° F.
Recycle rate _____ 2000 s.c.f.b. set at 100 p.s.i.g.
Pressure _____ Equilibrium.
Duration _____ 100 hours.

The sulfur content of the product was 0.01 percent by weight sulfur at 100 hours on stream. In the following table the yields and properties of the product fractions are compared with those from the feed stock.

|  | Gasoline, 15° C.–140° C. | | Residue, 140° C. | |
|---|---|---|---|---|
|  | Feed | Product | Feed | Product |
| Percent weight on feed | 36.4 | 40.5 | 63.6 | 58.5 |
| Specific gravity, 60° F./60° F. | 0.722 | 0.7205 | 0.856 | 0.856 |
| Sulfur, percent weight | 0.010 | 0.001 | 1.55 | 0.03 |
| Bromine number |  | 1.8 |  |  |
| Octane number (research) | 42 | 48 |  |  |

We claim:

1. A process for the hydrocatalytic desulfurization of a petroleum feedstock consisting of a blend of catalytically cracked gas oil and straight-run gas oil, said cracked gas oil being present in said blend in an amount up to about 20% by volume, which comprises contacting the feedstock with a catalyst consisting essentially of the oxides of cobalt and molybdenum supported on alumina, said catalyst also containing fluorine in an amount of about 0.1% to about 6% by weight of the catalyst, at a temperature within the range 750 to 800° F. and at a space velocity of the liquid feedstock within the range 1 to 5 v./v./hr., separating a hydrogen-rich gas from the treated feedstock, recycling said hydrogen-rich gas to the reaction zone until the pressure therein reaches equilibrium, separating hydrogen sulfide from the treated feedstock, and recovering a treated feedstock having a reduced sulfur content.

2. A process for the hydrocatalytic desulfurization of a petroleum feedstock consisting of a blend of catalytically cracked gas oil and straight-run gas oil, said cracked gas oil being present in said blend in an amount up to about 20% by volume, which comprises contacting the feedstock with a catalyst consisting essentially of the oxides of cobalt and molybdenum supported on alumina, said catalyst also containing fluorine in an amount of about 0.1% to about 6% by weight of the catalyst, at a temperature within the range 750 to 800° F. and at a space velocity of the feedstock within the range 1 to 5 v./v./hr., said temperature and space velocity being such that sufficient hydrogen is produced by dehydrogenation of the feedstock to convert organically combined sulfur contained in the feedstock into hydrogen sulfide, separating a hydrogen-rich gas from the treated feedstock, recycling said hydrogen-rich gas to the reaction zone until the pressure therein reaches equilibrium, separating hydrogen sulfide from the treated feedstock, and recovering a treated feedstock having a reduced sulfur content.

3. A process for the hydrocatalytic desulfurization of a petroleum feedstock consisting of a blend of 20% catalytically cracked gas oil and 80% straight-run gas oil, which comprises contacting the feedstock with a catalyst consisting essentially of the oxides of cobalt and molybdenum supported on alumina, said catalyst also containing fluorine in an amount of about 0.1% to about 6% by weight of the catalyst, at a temperature within the range 750 to 800° F. and at a space velocity of the liquid feedstock within the range 1 to 5 v./v./hr., separating a hydrogen-rich gas from the treated feedstock, recycling said hydrogen-rich gas to the reaction zone until the pressure therein reaches equilibrium, separating hydrogen sulfide from the treated feedstock, and recovering a treated feedstock having a reduced sulfur content.

4. A process for the hydrocatalytic desulfurization of a petroleum feedstock consisting of a blend of 20% catalytically cracked gas oil and 80% straight-run gas oil, which comprises contacting the feedstock with a catalyst consisting essentially of the oxides of cobalt and molybdenum supported on alumina, said catalyst also containing fluorine in an amount of about 0.1% to about 6% by weight of the catalyst, at a temperature within the range 750 to 800° F. and at a space velocity of the feedstock within the range 1 to 5 v./v./hr., said temperature and space velocity being such that sufficient hydrogen is produced by dehydrogenation of the feedstock to convert organically combined sulfur contained in the feedstock into hydrogen sulfide, separating a hydrogen-rich gas from the treated feedstock, recycling said hydrogen-rich gas to the reaction zone until the pressure therein reaches equilibrium, separating hydrogen sulfide from the treated feedstock, and recovering a treated feedstock having a reduced sulfur content.

References Cited in the file of this patent

UNITED STATES PATENTS

| 2,574,448 | Docksey et al. | Nov. 6, 1951 |
| 2,574,451 | Porter et al. | Nov. 6, 1951 |
| 2,591,525 | Engel et al. | Apr. 1, 1952 |
| 2,691,623 | Hartley | Oct. 12, 1954 |
| 2,718,490 | Porter | Sept. 20, 1955 |
| 2,771,400 | Porter et al. | Nov. 20, 1956 |
| 2,800,429 | Porter et al. | July 23, 1957 |

FOREIGN PATENTS

| 1,022,833 | France | Dec. 24, 1952 |